United States Patent [19]

Peterson et al.

[11] Patent Number: 5,882,543
[45] Date of Patent: Mar. 16, 1999

[54] COMPOSITIONS AND METHODS FOR DEHYDRATING, PASSIVATING AND SEALING SYSTEMS

[75] Inventors: William R. Peterson, Phoenix; Reneé E. Berman, Chandler; David Giaccio, Phoenix, all of Ariz.

[73] Assignee: Silicon Resources, Inc., Phoenix, Ariz.

[21] Appl. No.: 852,265

[22] Filed: May 6, 1997

Related U.S. Application Data

[63] Continuation of Ser. No. 429,210, Apr. 24, 1995, abandoned.

[51] Int. Cl.$^6$ ................... C09K 5/04; C09K 3/12
[52] U.S. Cl. ................... 252/72; 62/85; 62/93; 106/33; 252/68; 252/194
[58] Field of Search ................... 252/68, 72, 194; 62/85, 93; 106/33

[56] References Cited

U.S. PATENT DOCUMENTS

| | | | |
|---|---|---|---|
| 2,185,332 | 6/1940 | Crampton | 252/5 |
| 4,304,805 | 12/1981 | Packo et al. | 428/63 |
| 4,331,722 | 5/1982 | Packo et al. | 428/35 |
| 4,379,067 | 4/1983 | Packo et al. | 252/67 |
| 4,442,015 | 4/1984 | Packo et al. | 252/68 |
| 4,508,631 | 4/1985 | Packo et al. | 252/68 |
| 4,755,316 | 7/1988 | Magid | 252/68 |
| 4,965,333 | 10/1990 | Inouye et al. | 528/33 |
| 5,202,044 | 4/1993 | Hagihara et al. | 252/68 |
| 5,314,981 | 5/1994 | Takago et al. | 528/36 |
| 5,530,063 | 6/1996 | Nagai et al. | 525/101 |

FOREIGN PATENT DOCUMENTS

| | | |
|---|---|---|
| 364375 | 4/1990 | European Pat. Off. . |
| 538880 | 4/1993 | European Pat. Off. . |
| 56878 | 9/1993 | European Pat. Off. . |
| 1-165663 | 6/1989 | Japan . |
| 5-132615 | 5/1993 | Japan . |
| 7-3159 | 1/1995 | Japan . |

OTHER PUBLICATIONS

D. Sydney, "Why Compressors Fail Mechanically," *Air Conditioning, Heating and Refrigeration News*, §§1–6 (1991) No month available.

A. Lucas, "Report Airs Concerns About Fluorinated Compounds," *Chemical Week* (Feb. 8, 1995), p. 12.

B.D. Greig, "Formulated Polyol Ester Lubricants For Use With HFC 134a," *Proceedings of the International CFC and Halon Alternatives Conference*, (Sep. 1992) Washington, D.C., pp. 135–145.

*Metals Handbook, Desk Edition, American Society for Metals* (1991), pp. 6.64, 7.37 No month available.

Komatsuzaki and Izuka, "Ester Oils As Lubricant For HFC–134a Refrigerator In Domestic Appliance," *Proceedings of the International CFC and Halon Alternatives Conference*, (Sep. 1992), Washington, D.C., p. 189.

K.E. Davis and J.N. Vinci, "Effect of Additives in Synthetic Ester Lubricants Used With HFC–134a Refrigerant," *Proceedings of the International CFC and Halon Alternatives Conference*, (Sep. 1992) Washington, D.C., p. 125.

*Primary Examiner*—Christine Skane
*Attorney, Agent, or Firm*—Panitch Schwarze, Jacobs & Nadel, P.C.

[57] ABSTRACT

Methods and compositions for dehydrating, passivating and coating HVAC and refrigeration systems having fluid enclosures are provided. The methods include adding a composition including organometalloid and/or organometallic compounds to the system, allowing the compositions to react with water in the system and sealing the system. The organometallic compounds include at least one alkoxy, carboxy and/or enoxy functional group bound to the metal element within the compound. The organometalloid compounds include at least one enoxy functional group bound to the metalloid element within the compound. Compositions for sealing such systems are also provided. The sealing compositions also include one or more organometallic compounds having at least one enoxy, carboxy and/or alkoxy group and/or organometalloid compounds which include at least three hydrolyzable groups, at least one of which is an enoxy group. When added to the system the sealing compositions exit an opening, react with atmospheric moisture and an external surface of the system and seal the opening.

26 Claims, 2 Drawing Sheets where R = alkyl, aryl and m = metal surface such as Al, Cu, Fe.
M' = Si, Ge, Sn, Ti.

COMPOSITIONS AND METHODS FOR DEHYDRATING, PASSIVATING AND SEALING SYSTEMS

This application is a continuation of application Ser. No. 08/429,210 filed Apr. 24, 1995, now abandoned.

FIELD OF THE INVENTION

The present invention relates to methods of dehydrating, passivating and sealing HVAC and refrigeration systems, and organometallic and organometalloid compositions useful for dehydrating, passivating and sealing such systems.

BACKGROUND OF THE INVENTION

Recently, severe restrictions have been placed on the use of chlorofluorocarbons (CFCs) due to association of CFCs with the destruction of stratospheric ozone. In addition, CFCs have been labeled as environmentally unsafe in many countries worldwide. As a result, proposed alternative substances which can be substituted for CFCs in various CFC applications have been and are being developed. Among them are several new proposed hydrofluorocarbons (HFCs) such as the leading proposed substitute, HFC-134a and related compounds. These materials are already being sold as substitutes for CFC as refrigeration fluids. These replacement materials, while not ozone-depleting, contribute to the greenhouse effect. As a result, their use and escape into the atmosphere is the subject of the EPA's Significant New Alternatives Program, which limits the use of fluorinated compounds as alternatives for ozone-depleting chemicals. A. Lucas, "Report Airs Concerns About Fluorinated Compounds," *Chemical Week*, Feb. 8, 1995, p. 12.

The HFC replacement fluids are generally not as efficient as CFCs and require new types of lubricants for effective operation, thereby necessitating the redesigning of compressive-evaporative refrigeration and other systems using the HFCs. These new lubricants are sensitive to hydration, resulting in a tendency to absorb moisture from the air and moisture which has entered a charged refrigeration or other system through openings in the system such as from cracks and leaks. If water enters a refrigeration system having an HFC fluid, the water will degrade the lubricant promoting mechanical failure.

The newer working fluid refrigerants exhibit different solubilities than the CFCs, and are not miscible with well known lubricants in CFC systems such as conventional naphthenic mineral oil. Therefore, the new lubricants, including polyalkylene glycols (PAGs) and polyol esters (POES), have been developed. These lubricants are designed for the ozone-safe HFC-134a and related refrigerants.

Water in a system using these lubricants causes hydrolysis of the lubricating esters in a chemical reversion process. Esters undergoing acid-induced hydrolysis revert to their components with formation of alcohols and carboxylic acids. The lubricating properties of the esters degrade rapidly. With the resultant loss of lubrication, the compressive units experience excessive wear, and ultimately, catastrophic failure as the moving parts seize. B. D. Greig, "Formulated Polyol Ester Lubricants For Use With HFC 134a," *Proceedings of the International CFC and Halon Alternatives Conference*, (September, 1992), pp. 135–145. In U.S. Pat. No. 5,202,044, Hagihara et al. disclose that water severely affects performance of polyether based lubricants. These materials are hygroscopic and may contain up to 1500 ppm water. The moisture degrades their thermal stability in the presence of HFC-134a and causes organic materials such as PET films to be hydrolyzed.

The presence of water in refrigeration and other cooling, heating and ventilation systems has long been recognized as a problem and as having severe deleterious effects on such systems. The ubiquitous presence of moisture in the environment makes it extremely difficult to remove or eliminate moisture from such systems. Water is adsorbed on the surfaces of parts during manufacture and assembly including components such as evaporators, condensers and connecting tubing. It is present in refrigerants and other additives in varying amounts, is contained in lubricants and is introduced during charging or refilling of the systems. Water may also enter such systems through leaks around fittings and connectors, through hoses and cracks in metal that occur during operation and through improperly made connections.

These leaks also allow refrigerants or other working fluids to escape into the atmosphere, contaminating the environment and decreasing the efficiency and cooling capacity of the unit. If large amounts of cooling working fluids such as refrigerants escape, the system may overheat and the service life of the unit will thereby be shortened. Further, the unit may suffer mechanical failure from the loss of the working fluid. In general, leaks in heating and cooling systems also decrease the heat transfer efficiency of these systems.

Water in all types of compressive-evaporative systems decreases the system efficiency as a result of water's high heat of vaporization and high heat capacity. The high heat of fusion of water decreases the efficiency of a compressive-evaporative system by giving off heat in evaporation cycles as the water freezes. The resulting ice crystals can also block orifices in expansion valves and cause such systems to malfunction.

Water present in systems having metal, metal oxide or metal hydroxide surfaces also promotes surface oxidation. Such oxidation occurs within a compressive-evaporative system within the condenser, evaporator and connected metal tubing. These metal surfaces are coated with oxides and hydroxides of the composite metal due to the presence of water. The thickness of such a coating is dependent on the age and service life of the unit. The coatings are formed by oxidation of the metal caused by oxygen in the system as well as moisture which may also be present in the system. Formation is accelerated by the presence of acids. Even newly fabricated metal surfaces react with oxygen present in the atmosphere before unit assembly to form thin oxide layers on the metal surfaces. These thin oxide layers are termed "native" oxide layers. Air forms an oxide film 50 Å thick on aluminum which increases with the presence of water. *Metals Handbook, Desk Edition, American Society for Metals* (1991), p. 6.64.

All oxidated surfaces have high degrees of polarity, and, consequently have high surface energies. These high surface energies readily attract moisture and hold it through electrostatic interactions such as hydrogen bonding. This molecular water layer can exist to varying degrees even before assembly of refrigeration systems. During operation, more water may bond to the metal oxide surfaces.

Lubricating oil may also occlude these high energy surfaces through electrostatic interactions. The oil forms a film of lubricating oil on the surfaces which acts as an insulator, hindering efficient heat transfer. Lubricating oil also accumulates in low areas of a refrigeration system, decreasing the lubricant available to the compressor. Accumulated oil may cover accumulated water that has collected in poor return areas of a refrigeration or other system due to the lower specific gravity of the oil. The combined layers of oxide, water and oil decrease energy transfer and reduce operating efficiency. These oxide layers continue to increase in thickness as long as water is present, and as a result, they continue to decrease the unit efficiency. This phenomenon has been reported recently by Komatsuzaki and Izuka, "Ester Oils As Lubricant For HFC-134a Refrigerator In Domestic Appliance," *Proceedings of the International CFC and Halon Alternatives Conference*, (September, 1992), Washington, D.C., p. 189.

The use of CFCs and HCFCs, while their use is now restricted, has been noted to reduce wear on compressors. This has been related to the chlorine content of these working fluids. The working fluids decompose to form active chlorine compounds which react with metal surfaces within the systems to form protective metal chloride boundary layers. These layers have a positive anti-wear affect. K. E. Davis and J. N. Vinci, "Effect of Additives In Synthetic Ester Lubricants Used With HFC-134a Refrigerant," *Proceedings of the International CFC and Halon Alternatives Conference*, (September, 1992), Washington, D.C., p. 125. The active chlorine compounds produced can also combine with water present in the system to produce strong acids. These acids can be transported to evaporators and condensers where they corrosively attack metals and have the potential to cause leakage to the environment.

Copper plating, which produces wear, occurs in CFC, HCFC and HFC systems and is also related to the presence of water in the system. This phenomenon would be aggravated by polyol ester lubricants which can absorb up to 1500 ppm water from the atmosphere.

One current method for the removal of moisture from refrigeration and other systems includes providing a dryer unit to the system. The dryer units in refrigeration systems are typically positioned in the liquid, high-pressure refrigerant area at the outlet of the condenser units. These dryer-strainer units contain desiccants such as silica gel which attract water molecules to their surfaces. The water is held to a desiccant's surface by hydrogen bonding of the polar water molecules to the polar desiccant surface. This is an equilibrium phenomenon in which water molecules can be transferred back to the refrigerant. The desiccants employed have a high capacity for water entrapment, but a low affinity for the actual water molecules as indicated by their failure to completely remove water from the system and their slow action in achieving the absorption.

Alternatives to silica gel desiccants include zeolite systems in which water molecules are entrapped within pores in a zeolite. Zeolite systems are more efficient than silica gel desiccants in removing water. However, zeolites have a higher affinity for water, a low capacity for water entrapment, and are even slower to dehydrate than silica gel desiccants.

In refrigeration or other systems using dryers, as described above, water remains in the system in some form, for example, adsorbed on the desiccant surface, trapped within zeolites, or circulating within the system itself. It is not transformed to another species. Early attempts to chemically remove water are reported in U.S. Pat. No. 2,185,332 of Crampton.

Crampton describes adding sodium alkoxides to refrigeration systems which react with water to produce alcohol and sodium hydroxide, a very strong inorganic base that is insoluble in all compressive refrigeration system fluid components. The reaction products are extremely corrosive and would be expected to chemically react with system refrigerants causing their chemical breakdown or with metal surfaces within the system causing component deterioration.

The acid neutralizing properties claimed by Crampton would produce sodium chloride, another insoluble product. Formation of such insoluble particles has a detrimental effect on operating refrigeration systems by rapidly increasing wear of moving mechanical parts and by blocking orifices required for efficient operation. Sodium alkoxides are very strong organic bases and would be expected to react with refrigerants and other halogen-containing working fluids by hydrogen-halogen extraction causing working fluid decomposition.

More recent attempts to remove moisture and seal systems are described in U.S. Pat. Nos. 4,304,805, 4,331,722, 4,379,067, 4,442,015 and 4,508,631 of Packo et al. which teaches the use of silicon-containing compounds including certain mercaptosilanes, acyloxysilanes, aminosilanes, and alkoxysilanes in conjunction with acetic anhydride or aminosilanes.

The organotrialkoxysilane compositions of Packo et al. produce insoluble organosilsesquioxanes on reaction with water. Introduction of nitrogen-containing species, such as the aminosilanes, produces insoluble ammonium or amine salts in the presence of system acids, and generates toxic ammonia within the system. Ammonia and amines in systems employing fluorocarbon-based working fluids may promote undesirable chemical reactions leading to working fluid decomposition. Furthermore, the presence of salts within a system employing electrical connections is precluded for safety reasons. Incorporation of amines or ammonia-generating compounds renders indicating devices on cooling and refrigeration systems (such as "Dry Eye") inoperable by indicating a safe condition when one actually does not exist. Some moisture indicators turn blue in the presence of bases such as ammonia. This interaction provides a false reading as water may be present in the system even though the indicator exhibits a blue color. Ammonia or amines can also produce stress corrosion cracking of copper or brass, a substantial component of some refrigeration systems which use CFC, HCFC and HFC working fluids. *Metals Handbook, Desk Edition, American Society for Metals* (1991), p. 7.37.

Sydney has reported that lubrication is extremely important in all compressive-evaporative refrigeration systems. D. Sydney, "Why Compressors Fail Mechanically," *Air Conditioning, Heating and Refrigeration News*, §§1–6 (1991). Fluorocarbon systems pump a finite amount of lubricant with the refrigerant working fluids. The refrigerant flowing back to the compressor is intended to carry that oil back to the compressor. Compressive-evaporative fluorocarbon refrigeration systems are designed and installed to perform this function by maintaining a low pressure drop to ensure proper oil return. Oil collecting in evaporators and coating the tubes causes a drop in evaporative pressure and insufficient oil return. The lack of oil returning to the compressor causes improper lubrication. Poor lubrication results in oil and compressor overheating as well as excessive wear. High oil retention in the evaporators and condensers leads to compressor failure from the excessive wear and overheating or to motor burnout.

The thermal stability of dehydrating compositions is important in compressive-evaporative refrigeration and other heating and cooling systems due to the harsh and extreme conditions of those systems. Operating systems employing compression-evaporation cycles have pressure and temperature extremes that may promote component degradation. A typical HCFC-22 system will have pressures of about 200 to 300 psi and temperatures of about 200° to about 225° F. Temperatures within compressors can typically approach 275° F. Units not operating properly, for example those having restricted valves or insufficient working fluid or lubricant return, may exceed operating temperatures of 300° F. If temperatures of about 350° F. occur in compressors, such conditions may cause lubricants to "coke," i.e., to turn to carbon, such that valves may become carbon-coated and particles may be generated which tend to clog the strainer/dryer resulting in reduced working fluid flow. Decomposition of the refrigerant or other working fluid at these operating temperatures produces the elemental components of the working fluid including halogens such as chlorine and acids such as hydrochloric acid. A need exists, therefore for a dehydration composition which is able to maintain its integrity and reactivity without degradation or functional change under these harsh operating conditions.

New regulations eliminating manufacture of CFC-12 and HCFC-22 in the year 2002 based on the ability of these refrigerant working fluids to deplete ozone make it imperative that these materials not be released from systems employing them. In addition, the new alternatives such as HFC-134a or HFC-152a should not be released due to their nature as greenhouse gases which contribute to global warming. The containment of these gases within operating units will exhibit beneficial effects to the environment and reduce costs related to securing these materials and converting to further alternative working fluids. The containment of these materials can best be addressed by the environmental isolation of the system using them. A need in the art exists for a method for isolating these systems which takes account of the working fluids, lubricants and methods of operation of the current systems.

In sum, a need in the art exists for a method for sealing leaks in refrigeration, air conditioning, heating, ventilation and related systems and for the complete dehydration of the systems. Complete dehydration is desirable for ensuring proper operation without formation of insoluble particles, gels or varnishes that result from reaction of sealants and/or other additives with contained system moisture.

SUMMARY OF THE INVENTION

The present invention includes a method for dehydrating HVAC and refrigeration systems having a fluid enclosure. The method comprises adding to the system a composition which comprises at least one organometallic compound. The organometallic compound has at least one functional group bound to the metal element within the organometallic compound. The functional group is an enoxy, carboxy and/or an alkoxy functional group. The composition is allowed to react with $H_2O$ in the system to dehydrate the system, and the enclosure is sealed.

The invention also includes a method for dehydrating and passivating HVAC and refrigeration systems having a fluid enclosure. The method comprises adding a composition to the system which comprises at least one compound selected from the group consisting of an organometallic compound and an organometalloid compound. The organometallic compound has at least one enoxy, carboxy and/or alkoxy functional group bound to the metal element within the compound. The organometalloid has at least one enoxy functional group bound to a metalloid element within the organometalloid compound. The composition is allowed to react with $H_2O$ in the system to dehydrate the system. The composition is also allowed to react with an interior surface of the enclosure to passivate and coat the surface, and the enclosure is sealed.

The invention also includes a method for sealing HVAC and refrigeration systems having a fluid enclosure, wherein the system has been chemically dehydrated and the enclosure has an external surface and an opening. The method comprises adding a composition to the system which comprises at least one second compound selected from the group consisting of an organometallic and an organometalloid compound. The organometallic compound in the composition has at least one hydrolyzable functional group bound to the metal element within the organometallic compound. The hydrolyzable functional group is an enoxy, carboxy and/or an alkoxy functional group. The organometalloid compound in the composition has at least three hydrolyzable functional groups bound to the metalloid element within the organometalloid compound. At least one of the hydrolyzable functional groups is an enoxy functional group. The composition exits through the opening and chemically reacts with atmospheric moisture and the external surface to form a polymeric seal bound to the external surface.

The present invention further includes a composition for dehydrating and passivating HVAC and refrigeration systems. The composition comprises an organometallic compound and at least one organometalloid compound as described above for use in the method for dehydrating and passivating such systems.

A composition for sealing HVAC and refrigeration systems which have been chemically dehydrated is also included in the invention. The compositions include and organometallic and an organometalloid compound as described above for the method for sealing such systems.

BRIEF DESCRIPTION OF THE DRAWINGS

The foregoing summary, as well as the following detailed description of preferred embodiments of the invention, will be better understood when read in conjunction with the appended drawings. For the purpose of better understanding the invention, there are illustrated in the drawings surfaces which have been treated with preferred compositions according to the present invention. It should be understood, however, that the number of possible structures formed on the surfaces by the compositions according to the invention is not limited to the precise structure as shown. In the drawings.

DETAILED DESCRIPTION OF PREFERRED EMBODIMENTS

Figure 1:
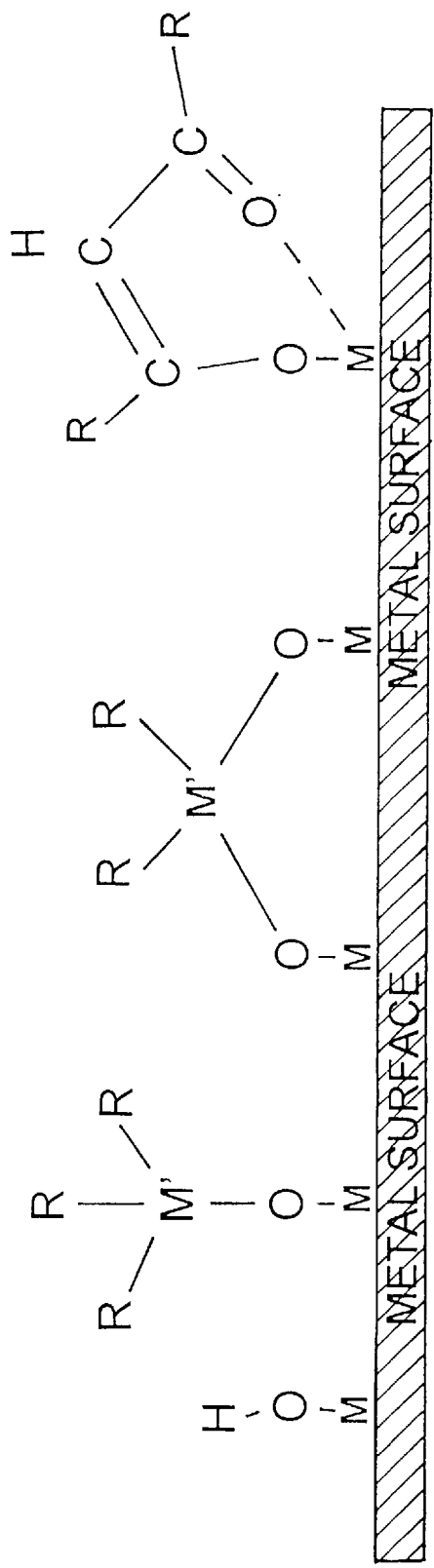
FIG. 1 is a greatly enlarged schematic diagram of a passivated surface after reaction with a preferred dehydrating and passivating composition according to the present invention.

The present invention includes methods and compositions for dehydrating, passivating and sealing HVAC and refrigeration systems having internal and external surfaces which preferably include materials such as metals, metal oxides or metal hydroxides. The invention will be described generally, then specific methods and compositions will be described in greater detail. The method for dehydrating an HVAC or refrigeration system includes adding a composition which preferably includes at least one compound preferably, an organometallic and/or an organometalloid compound, allowing the composition to react with $H_2O$ in the system to dehydrate the system, and closing the system. The method for sealing a chemically dehydrated HVAC or refrigeration system includes preferably adding a further composition which includes at least one compound which is preferably also an organometallic and/or an organometalloid compound.

The dehydrating and sealing compositions preferably each include at least one compound comprising both an organometallic compound and an organometalloid compound. Preferably, the organometallic compounds have alkoxy, carboxy and/or enoxy functional groups bound to the metal element. The dehydrating organometalloid compounds preferably have at least one enoxy functional group bound to the metalloid element. In the case of the sealing composition, the organometalloids preferably have at least three hydrolyzable groups bound to the metalloid.

In certain combinations these organometallic and organometalloid compounds in the dehydrating, passivating and sealing compositions promote rapid and complete reaction with water and with surfaces including materials such as metal, metal oxide and metal hydroxide within the systems and seal the systems. The compositions are preferably additives for use in the systems, however, a system can be made with the compositions already included in their working fluids. Preferably, a dehydrating and passivating composition according to the present invention is added to the system before adding a sealing composition.

The dehydrating compositions rapidly and irreversibly remove water and water vapor through chemical reaction. They also passivate the system by bonding to interior surfaces in the system to render the surfaces inert and coated thereby providing more efficient energy transfer and increasing overall system efficiency. The removal of all moisture from the system also provides stabilization of hydrolytically sensitive lubricants, which provides longer mechanical life to the system and its operating components. As used in this application, "passivate" is intended to include reducing the reactivity of a chemically active metal surface by treating the surface with a chemical composition.

In one preferred method, the sealing compositions, which are preferably added to the system after the dehydrating and passivating compositions, function with and are compatible with the dehydrating and passivating compositions. The sealing compositions circulate within a fluid enclosure within the systems. If the system has a leak, the sealing composition exits through the leak and hydrolytically reacts with moisture in the atmosphere to form a polymeric seal on the external surface of the system.

In the present methods for dehydrating, passivating and sealing systems, the systems preferably are those systems known as HVAC systems which include systems for the circulation of air such as a ventilation system, or for a system for modification of air temperature such as heating and/or cooling systems. In addition, the systems may preferably be refrigeration systems, more preferably, compressive-evaporative refrigeration systems. Particularly preferred are air conditioning systems or heating systems, such as a heat pump, in which ammonia or fluorocarbon compounds are the preferred working fluids. Working fluids include those fluids which are used within the system and are necessary for carrying out the system function, for example, in a refrigeration or air conditioning system, the working fluid is the refrigerant.

Preferably, the systems include a fluid enclosure preferably having an interior surface. The interior surface preferably includes a material such as metal, metal oxide, metal hydroxide and similar materials. The interior surface preferably includes, for example, stainless steel, aluminum, copper, titanium, iron, zinc, and related metals, their oxides, hydroxides and alloys. The system preferably also includes an external surface preferably formed of a material including metal, metal oxide, metal hydroxide and similar materials as previously described.

The fluid within the fluid enclosure preferably includes a working fluid and/or a lubricant. The working fluid may be already present in the system prior to addition of the compositions according to the present invention. Alternatively, the working fluid can be added to the system together with the compositions according to the present invention as a heterogeneous or homogeneous mixture or solution.

The detailed description will particularly address the methods for dehydrating, passivating and sealing using the below-described compositions in refrigeration or air conditioning systems, however, it should be understood, based on this disclosure, that other systems such as, for example, heat pumps and air ventilation systems, which benefit from dehydration or passivation during operation and/or those which use working fluids and/or lubricants which are compatible with the compositions as described could be effectively treated in accordance with the dehydrating, passivating and sealing methods.

It is preferred that the compositions of the present invention be used in systems having either a working fluid or a lubricant, and more preferably, in a system having both a working fluid and a lubricant. The working fluids are preferably compatible with the compositions according to the present invention. Preferred working fluids include ammonia, and more preferably, hydrohalofluorocarbons such as hydrochlorofluorocarbons, hydrofluorocarbons, halofluorocarbons such as chlorofluorocarbons, fluorocarbons or a mixture of these fluorinated compounds. Preferred fluorocarbon-based working fluids useful in conjunction with the compositions of the present invention include those having a numerical fluorocarbon code designated by the American Society of Refrigerating Engineers (ASRE). Preferred ASRE codes include 11, 12, 12B1, 13, 13B1, 14, 21, 22, 32, 42, 115, 124, 125, 134, 134a, 143a, 152a, 161, 218, and 227ea.

Preferably, the working fluids chosen are compatible with the compositions used in the methods and the compositions are chosen to be soluble in the working fluid, the lubricant or both the working fluid and the lubricant. In one embodiment, the compositions can be chosen so that one compound within the composition is preferentially soluble in the working fluid and the other compound in the composition is preferentially soluble in the lubricant. It should be understood, based on this disclosure, that other working fluids meeting the above-criteria may be used with the present compositions without departing from the spirit of this invention.

Lubricants useful in systems in which the compositions are used may include any lubricant typically used in such systems including those known to one of ordinary skill in the art, or those which may be developed for use with working fluids as previously described. Preferable lubricants for use in compressive-evaporative refrigeration and air conditioning systems which are compatible with the present compositions and with the working fluids described include, for example, lubricants such as polyalkylene glycols and polyol esters as used with the preferred commercial hydrofluorocarbon working fluids, naphthenic mineral oils, fluorosilicone oils, alkylbenzene oils and similar compounds used with known working fluids such as halo- and hydrohalofluorocarbons, and other similar lubricants.

It would be understood to one of ordinary skill in the art, based on this disclosure, that the choice of lubricants and working fluids is dependent on the type of system, the intended use, the length of service life of the system and the extent of daily use of the system, for example, a home refrigerator, an automobile air conditioning system, a home heating and air conditioning system, a commercial refrigeration system, and so forth. In addition, it should be understood from this disclosure that the compositions can be formulated and adapted for use with particular working fluid/lubricant combinations.

In the present method for dehydrating HVAC and refrigeration systems having a fluid enclosure, a composition comprising at least one organometallic compound is added to the system. Preferably, the composition also includes an organometalloid compound, and more preferably, the composition includes both an organometallic and an organometalloid composition. In the present method of dehydrating and passivating such systems, a composition is added to the system which includes at least one organometallic and/or organometalloid compound. Preferably, the dehydrating and passivating compositions include both an organometallic and an organometalloid compound.

Preferred compositions which can be used in the method for dehydrating and passivating will now be described, followed by a description of preferred compositions which may added in the preferred method for sealing.

The compositions used in the dehydrating method include at least one compound as described below. The dehydrating composition, may include any number of these compounds, for example, the compositions may be single compound, binary, ternary or quaternary compound compositions. The compounds used within the dehydrating and passivating compositions are preferably organometallic and/or organometalloid compounds.

The metal element within the organometallic compound is preferably capable of bonding to an enoxy, carboxy, and/or an alkoxy functional group. Preferred metals for use in organometallic compounds within preferred dehydrating compositions include, for example, tin (Sn), lead (Pb), titanium (Ti), zirconium (Zr), hafnium (Hf), vanadium (V), aluminum (Al), chromium (Cr), manganese (Mn), iron (Fe), cobalt (Co) and zinc (Zn). Most preferably, the metals are Sn or Ti.

Metalloid elements which can be used in organometalloid compounds within dehydrating and passivating compositions are also preferably capable of bonding to an enoxy, carboxy, and/or an alkoxy functional group. Preferred metalloid elements include silicon (Si), boron (B), arsenic (As), antimony (Sb), tellurium (Te) and germanium (Ge). More preferably, the metalloid is Si or Ge, and most preferably, the metalloid is Si.

The organometallic compounds which may be used in the present dehydrating and passivating compositions have at least one functional group bound to the metal within the organometallic compound. The functional group may be either an alkoxy, a carboxy or an enoxy functional group. The metal may have from one to five alkoxy, carboxy and/or enoxy functional groups bound to the metal depending upon the oxidation potential of the metal and the presence of other radicals or non-functional groups. Preferably, the metal has at least one enoxy functional group. The enoxy functional group preferably has the formula:

where, X, Y and Z are defined below for the organometallic and organometalloid compounds in the dehydrating compositions, and $a$ is 1 or 2.

Compositions for dehydrating and passivating compositions to the present invention preferably comprise at least one compound having the formula:

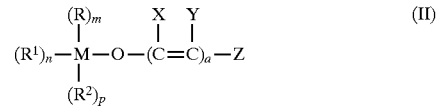

wherein:

M is an element selected from the group consisting of Sn, Pb, Ti, Zr, Hf, V, Al, Cr, Mn, Fe, Co, Zn, Si, Ge, B, As, Sb, and Te;

R is selected from the group consisting of straight and branched chain alkyl groups of from 1 to 18 carbon atoms, cycloalkyl and cycloalkene groups of from 3 to 8 carbon atoms, fluorine-substituted alkyl groups of from 1 to 12 carbon atoms, fluorine-substituted cycloalkanes and fluorine-substituted cycloalkenes of from 3 to 8 carbon atoms, phenyl, ethylenephenyl, straight and branched chain alkene groups of from 2 to 18 carbon atoms, alkyl-substituted phenyl, and Z';

$R^1$ is selected from the group consisting of R,

—OR, and —O$_2$CR;

$R^2$ is selected from the group consisting R, —OR, and —O$_2$CR;

X is selected from the group consisting of hydrogen, straight and branched chain alkoxy groups of from 1 to 18 carbon atoms, straight and branched chain fluorine-substituted alkoxy groups of from 1 to 18 carbon atoms, phenoxy, benzyloxy, straight and branched chain alkyl groups of from 1 to 18 carbon atoms, cycloalkyl and cycloalkene groups of from 3 to 8 carbon atoms, fluorine-substituted alkyl groups of from 1 to 12 carbon atoms, fluorine-substituted cycloalkanes and fluorine-substituted cycloalkenes of from 3 to 8 carbon atoms, phenyl, ethylenephenyl, straight and branched chain alkene groups of from 2 to 18 carbon atoms, and alkyl-substituted phenyl groups;

Y is selected from the group consisting of straight and branched chain alkyl groups of from 1 to 18 carbon atoms, cycloalkyl and cycloalkene groups of from 3 to 8 carbon atoms, fluorine-substituted alkyl groups of from 1 to 12 carbon atoms, fluorine-substituted cycloalkanes and fluorine-substituted cycloalkenes of from 3 to 8 carbon atoms, phenyl, ethylenephenyl, straight and branched chain alkene groups of from 2 to 18 carbon atoms, alkyl-substituted phenyl groups, and Z;

Z is selected from the group consisting of hydrogen and Z';

Z' is selected from the group consisting of straight and branched chain 1-carbonyl-substituted alkane groups of from 1 to 18 carbon atoms, straight and branched chain 1-carboxy-substituted alkyl groups of from 2 to 18 carbon atoms, straight and branched chain alkoxy groups of from 1 to 18 carbon atoms, straight and branched chain fluorine-substituted 1-carbonyl alkyl groups of from 2 to 18 carbon atoms, 1-carboxy-o-alkylesters having at least one selected from the group consisting of straight and branched chain alkyl groups of from 1 to 18 carbon atoms, 1-carboxy-o-phenyl esters, 1-carboxy-o-ethylene oxide esters having from 1 to 20 ethylene units, benzoyl, alkyl-substituted benzoyl having alkyl groups of from 1 to 8 carbon atoms, and o-benzoate;

a is an integer from 0 to 2;

m is an integer from 0 to 4; and n is an integer from 0 to 1;

p is an integer from 0 to 4. The sum of m+n+p+1 is preferably equal to the oxidation potential of M. When all of a, m, n, and p are 0, Z preferably equals Z'.

An enoxy functional group may preferably be provided to the organometallic compound as the $R^1$ group or as the group attached to the metal having formula (I) with a being 1 or 2. The Z group may be bound to the metal as a part of an enoxy radical, or may be directly attached to the metal by bonding to the oxygen attached to the metal in formula (II) when a is 0. In a preferred embodiment, Z is a 1-carboxylate-substituted alkyl group having at least two carbon atoms. The organometallic compound may also have one or more alkoxy groups which are preferably attached to the metal element as $R^1$ and/or $R^2$. If the compound has no enoxy functionality, a may be equal to 0. Carboxy groups may be bound to the metal element directly as an $R^1$ or $R^2$ groups, or carboxy groups may be attached to the oxygen bound to the metal when a is 0 and Z provides the carboxy group with the oxygen. Other groups which may be bound to the metal are preferably unsubstituted or substituted, straight or branched chain alkyl or alkene radicals, cycloalkyl or cycloalkenes attached to the metal as R as described above. The number of species attached to the metal element is determined by the oxidation potential of the metal as described above.

The organometalloid compound which can be used in the compositions for dehydrating and passivating preferably includes at least one enoxy functional group bound to the metalloid element. The enoxy group in a preferred embodiment has formula (I) where X, Y and Z are as previously defined for formula (II) and a is preferably 1 or 2. The oxidation potential of the metalloids, preferably ±4, limits the number of groups bound to the metalloid element to four. Therefore, the sum of m+n+p+1 is the oxidation potential of the metalloid. The organometalloids preferably have metalloid elements as defined above, preferably, Si, Ge, B, As, Sb, and Te. The organometalloids may be defined in accordance with formula (II) above, where M is a metalloid as described, a is an integer from 1 to 2, m is an integer from 0 to 3, and p is an integer from 0 to 3. As with the organometallic compound, in a preferred embodiment, the Z-group in the organometalloid compound is a 1-carboxylate-substituted alkyl group having at least two carbon atoms.

Both the organometallic and the organometalloid compounds preferably each have no greater than two enoxy functional groups bound to the metal and/or metalloids within the composition. In one preferred embodiment, the enoxy functional group bound to either or both of the metals and/or metalloids in the composition includes either a 1-propenoxy-substituted alkyl group having at least two carbon atoms or an acyloxy-substituted alkyl group having at least two carbon atoms.

It should be understood by one of ordinary skill in the art, based on this disclosure, that the selection of functional groups and the substitution of other groups having a similar chemical effect for R, $R^1$, $R^2$, X, Y and Z within the dehydrating and passivating organometallic and organometalloid compounds having preferred formula (II) are within the scope of this invention. The addition of inert species to preferred formula (II) which do not affect the dehydrating ability of the organometallic or organometalloid compositions is also within the scope of the present invention.

The dehydrating compositions are preferably used as additives to the system as described above. Once added, the dehydrating composition eliminates $H_2O$ in the system and preferably also reacts with a surface in the system to passivate and coat the surface. The compositions are preferably liquids which are soluble in the working fluid and/or the lubricant. The composition preferably dehydrates the lubricant such that the lubricant is stabilized to prevent hydrolysis and the breakdown of the lubricant structure.

In preferred embodiments, the composition includes a binary compound composition having a first and a second compound. Both the first and second compounds preferably have formula (II) above, and more preferably, the first compound is an organometallic and the second compound is an organometalloid.

In addition, in some preferred binary compositions, it is preferred that the first compound is preferentially soluble in the working fluid and the second compound is preferentially soluble in the lubricant within the system. Preferred dehydrating compositions having the two-components as described above are particularly useful for dehydrating refrigeration and air conditioning systems where the lubricant and working fluid, in this case the refrigerant, exist in two phases, such as in a system using HCFC-22 or HCFC-502 as a refrigerant and a hydrocarbon as a lubricant, in which the hydrocarbon lubricant is partially soluble in the refrigerant. The lubricant remains essentially in the compressor section of such a system with some portions of the lubricant being transmitted through the unit by mechanical flow of the refrigerant.

In a preferred binary dehydrating composition for use in such a system, the first compound is preferably a preferentially fluorocarbon-soluble compound which is a lower molecular weight species and which may contain a fluorocarbon substituent. The preferentially hydrocarbon-soluble compound is a higher molecular weight species preferably having a long-chain oleophilic group.

The first compound, which is preferentially fluorocarbon-soluble, will move with the refrigerant portion of the system and dehydrate and passivate portions of the system such as condensers and evaporators. The preferentially hydrocarbon-soluble compound remains with the lubricant to stabilize and dehydrate the lubricant. The by-product of the hydration reaction, in this preferred embodiment, is a material which will assist in lubrication and which will form lubrication enhancers and stabilizers in the system.

Such compositions may also have additional compatible compounds. Examples of a ternary dehydrating composition in accordance with the present invention which can be used in a HCFC-22 type working fluid and compatible lubricant include a composition of trimethylsiloxy stearate, dibutyltindilaurate and trifluoromethylisopropenoxytrimethylsilane.

Organometalloids according to the present invention, such as organosilicon compounds, have increased solubility in refrigerants and similar working fluids compared to similar non-silicon containing compounds. Substitution of fluorine in the organic substituents of the organometallic and organometalloid compounds increases the solubility in fluorocarbon-based refrigerants and other working fluids. This is of particular importance when the composition is to be used in a homogeneous, single phase system such as a system using HFC-134a.

The dehydrating compositions according to the present invention are preferably provided to the system in a working fluid charge, for example, a refrigerant charge. However, it should be understood based on this disclosure, that the compositions may be added after addition of such a charge. The charge preferably comprises no greater than about 50% by weight of the working fluid. The composition is preferably provided to the system such that it is from about 1 to about 10 weight percent of the charge, and more preferably, about 2 to about 7 weight percent of the charge.

The dehydrating and passivating compositions increase efficiencies in systems such as compressive-evaporative refrigeration systems by the chemical reaction of the metal and/or metalloid substituted functional groups in the composition with $H_2O$, preferably in the form of water or water vapor, through a proton transfer from the water molecule to the oxygen bound to the metal and/or metalloid. The M—O bond is cleaved which liberates the protonated alkoxy, carboxy or enoxy functional group and simultaneously forms a hydroxy moiety. This reaction is allowed to proceed such that water is removed from the system. The reaction is accelerated by having both organometallic and organometalloid compounds within the composition provided to the working fluid. The reaction is represented by the following mechanism:

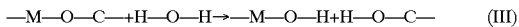

(III)

The metal and/or metalloid hydroxy species is then expected to react with other dehydrative molecules or with internal metal, metal oxide or metal hydroxide interior surfaces within a system's fluid enclosure to provide compounds according to the following reaction mechanism:

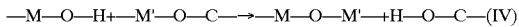

(IV)

The metals and/or metalloids M may be the same or different from the metals and/or metalloids M'. The generated hydroxy metal species, —M—O—H, is also preferably allowed to react with interior surfaces in the fluid enclosure within the system to passivate and coat the interior surface, with another different metal species to form a reactive activated or metallic species having greater reactivity toward water or with a similar material to produce a less reactive bond. Organometallic and organometalloid co-reactants will function as catalysts to greatly increase rates of the dehydration and passivation reactions.

The reactivity of the metal-oxygen-metal or the metal-oxygen-metalloid bond is related to the electropositive nature of the metals. Metals having a high electropositive character are more reactive. A bond of Si—O—Ti is more reactive with water than Si—O—Si. The speed of hydrolysis is proportional to the electropositive character of the metal. Metal alkoxides react rapidly with water, whereas metal ketonates or diketonates react more slowly or resist hydrolysis. An example of a metal-oxygen-metalloid bond structure as shown below occurs from the hydrolytic reaction of dialkyldialkoxysilane and titanium dialkoxybis(2,4 pentanedioate):

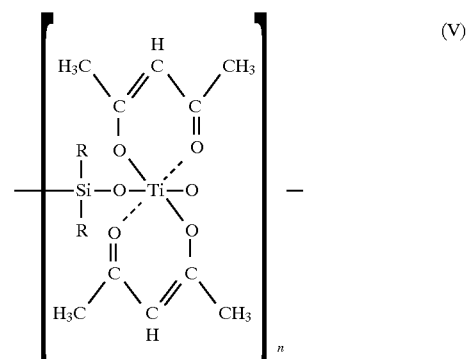

(V)

The enoxy groups contained in organometalloid compounds are more reactive with water than alkoxy groups and react preferentially before the alkoxy groups. The enoxy groups formed on reaction with water are capable of tautomerization or proton migration to the more energetically favorable ketone species. For example, the isopropenoxy silane and germane derivatives will form acetone after reaction with water according to the following mechanism, where M is a metalloid such as silicon or germanium:

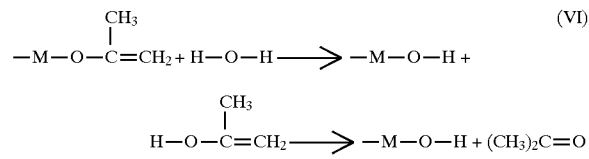

(VI)

When using an organometallic compound in a dehydrating composition in accordance with the present invention, additional alkoxysilanes react at an accelerated reaction rate with the organometallic co-reactants present and form alcohols as products of reaction. When the compositions include compounds having preferable alkoxy and enoxy functionalities, the enoxy derivatives are more reactive than the alkoxy derivatives. Complete system dehydration can be achieved by the chemical reaction with compositions preferably containing metalloids, and more preferably silicon, which convert water to disiloxanyl and low molecular weight siloxanyl species, ketones, alcohols or a mixture of ketones and alcohols. It has been discovered that the presence of organometallic and organometalloid co-reactants described in this invention, which are derived from the compounds used in the present compositions, accelerate dehydration such that the system is dehydrated at a higher efficiency and more completely than a dehydration carried out with a single component dehydrating composition which does not provide such a co-reactant.

The increased operating efficiencies in systems, such as refrigeration and air conditioning systems, achieved through use of the compositions of this invention is due to the substantial, and preferably complete dehydration as described above, as well as the surface reaction phenomenon occurring on the interior surfaces of the system. The dehydrating and passivating compositions chemically, and rapidly, react with metal, metal oxide, metal hydroxide or similar interior surfaces within the fluid enclosure of a system to passivate, coat and protect these interior surfaces.

The surface reaction in a refrigeration or air conditioning system, for example, occurs within the portion of the system including the condenser and evaporator. This greatly increases efficiency of the system by increasing the rate of heat transfer, decreasing the amperage draw of electrical driven units, improving lubrication through increasing lubricant volume availability, and removal of thermally insulating lubricant films which would ordinarily build up on interior surfaces in these systems.

The surface reaction to passivate the surface and to reduce surface energies occurs in a two-step manner. The high solubility of the present compositions in oils promotes rapid penetration of the oils occluded to the interior surfaces. Reaction at the interface between the oil and the surface with bonded water follows rapidly with complete chemical removal of the water and formation of dehydrating co-reactants. The dehydrated surface then reacts with additional dehydrating compositions including the co-reactants to form a treated, surface having greatly decreased surface energy. As a result, oil attraction is decreased and the oil is released to return to the compressor unit.

The passivated surfaces are permanent and resist further oxidation. Particular organometalloid compounds, and preferably, particular organosilicon compounds, are most useful for passivation as they rapidly form stable bonds to an interior metal, metal oxide, metal hydroxide or similar surface. Organometalloid compounds having enoxy functionalities react more rapidly with the surfaces than do organometalloids having alkoxy derivatives. Organometallic compounds exhibit higher surface reactivity through alkoxy derivatives. Organometallic and organometalloid dehydrating and passivating compositions react with surface hydroxyls forming organometalloid/organometallic bonds with the surface and form co-reactants which may also react with the surface through chelative interactions. For example, 2-organosiloxypent-2-ene-4-one compounds react with a metal surface to form organosiloxy bonds and co-reactants including 2,4 diketones which are capable of also reacting with the metal surface.

Passivated surfaces include surface structure formations such as shown in FIG. 1. Passivated surfaces also include organometallic and/or organometalloid structures as shown, for example, by the stabilized structure in formula (V).

Passivated surfaces which occur following reaction do not have sufficient energy to retain oil on the surface and the oil is returned to the system, for example, to the receiver or compressor, by mechanical action of the moving working fluid, for example, the refrigerant. The absence of the insulative oil layer promotes more rapid and efficient heat transfer.

The dehydrative compositions of this invention stabilize a variety of lubricants, particularly those employed with hydrofluorocarbon refrigerants, by chemically combining with and removing the moisture in the system and in these lubricants. The synthetic lubricants which are used with the new refrigerants have glycol or ester functionalities, and, therefore, have high affinities for water. These oils may contain up to 1500 ppm of water. In the acidic operating conditions of a system using fluorocarbon-based working fluids, the generated acids combine with moisture to rapidly degrade the lubricant. The acids and water cause hydrolysis of the esters to their starting components through a process similar to the one in which they were formed. The resulting chemical breakdown causes a rapid decrease in the viscosity and lubricating capabilities of the oils.

Preferred examples of dehydrating and passivating compositions according to the present invention include:

1. Various binary compositions including dibutylbis(2,4 pentanedioate)tin and 1-dimethylmethoxysiloxy-1-methoxybut-1-ene-3-one;
2. A binary composition including from about 10 parts of dimethyldimethoxysilane and from about 0.1 to about 10 parts of dibutylbis(2,4-pentanedioate)tin;
3. A binary compositions including from about 100 parts of dimethyldialkoxysilane and from about 1 to about 50 parts of titanium diisopropoxydi-2,4-pentanedioate;
4. A composition including 2-trimethylsiloxypent-2-ene-4-one; and
5. A ternary composition including from about 1 to about 100 parts of trimethylethyloxysilane, from about 1 to about 100 parts of dimethyldiethoxysilane and from about 1 to about 100 parts of dibutylbis(2,4-pentanedioate)tin.

The preferred compositions useful in the method for sealing HVAC and refrigeration systems having a fluid enclosure of the present invention include at least one compound as described below. The compositions may include any number of these compounds, for example, the sealing compositions may be single compound, binary, ternary or quaternary compound compositions. The compounds used within the sealing compositions are preferably organometallic and/or organometalloid compounds as described below. Preferably, the composition comprises at least one organometallic compound and at least one organometalloid compound.

The metal element within the organometallic compound preferably is capable of bonding to an enoxy and/or an alkoxy functional group. The metalloid element within the organometalloid compound is preferably capable of bonding to at least three hydrolyzable groups, and preferably to at least three enoxy and/or alkoxy functional groups. Preferred metals and metalloids include those preferred metals which are useful in the organometallic and organometalloid compounds within the dehydrating and passivating compositions as described above.

The organometallic compounds which may be used in the sealing compositions and in the present sealing method have at least one functional group bound to the metal within the organometallic compound. The functional group may be an enoxy, carboxy, and/or an alkoxy functional group. The metal may have from one to five of such functional groups bound to the metal depending upon the oxidation potential of the metal and the presence of other radicals or non-functional groups bound to the metal. Preferably, the metal has at least one enoxy functional group. The enoxy functional group preferably has formula (I), where X, Y and Z are defined above for the organometallic and organometalloid compounds within the dehydrating compositions, and a is 1 or 2.

Sealing compositions according to the present invention preferably comprise at least one compound having the formula:

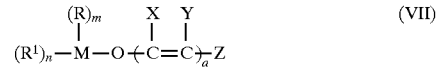

(VII)

wherein, M, R, X, Y, Z, and Z' are as defined above for formulas (I) and (II) in the dehydrating and passivating compositions, and $R^1$ is selected from the group consisting of

(I)

—OR, and —O$_2$CR;

a is an integer from 0 to 2;

m is an integer from 0 to 4; and n is an integer from 0 to 4.

The sum of m+n+1 is preferably equal to the oxidation potential of M. When all of a, m, and n are 0, Z preferably equals Z'.

An enoxy functional group may be provided to the organometallic compound as an $R^1$ group or as the group attached to the metal having formula (I) with a being 1 or 2. The Z group may be bound to the metal as a part of an enoxy radical, or may be directly attached to the metal by bonding to the oxygen attached to the metal in formula (VII) when a is 0. In a preferred embodiment, Z is a 1-carboxylate-substituted alkyl group having at least two carbon atoms. The organometallic compound may also have one or more alkoxy group(s) which are preferably attached to the metal element as $R^1$. If the compound has no enoxy functionality, a may be equal to 0. A carboxy group may also be attached to the metal as an $R^1$ group, or, when a is 0, by the Z group and oxygen attached to the metal. Other groups which may be bound to the metal are preferably unsubstituted or substituted, straight or branched chain alkyl or alkene radicals, cycloalkanes or cycloalkenes attached to the metal as R as described above.

The organometalloid compound which can be used in the sealing compositions preferably includes at least one enoxy group bound to the metalloid element, for example, when M is Si, Ge, B, As, Sb, Te or a similar metalloid. The enoxy group in a preferred embodiment has formula (I) where X, Y and Z are as previously defined for formulas (I), (II), and (VII) and a is preferably 1 or 2. The oxidation potential of the metalloids determines the number of groups which may be bound to the metalloid element. Therefore, when M is a metalloid, the sum of m+n+1 is preferably no greater than the oxidation potential of the particular metalloid. The organometalloids in the sealing compositions preferably have metalloid elements as defined above. Further, m is preferably an integer from 0 to 1, n is preferably an integer from 2 to 3. As with the organometallic compound useful in the sealing compositions, in a preferred embodiment, the Z-group in the organometalloid compound is a 1-carboxylate-substituted alkyl group having at least two carbon atoms.

In either or both of the organometallic and the organometalloid compounds useful in the sealing methods and compositions, the enoxy functional group bound to either or both of the metals and/or the metalloids in the composition includes a 1-propenoxy-substituted alkyl group having at least two carbon atoms or an acyloxy-substituted alkyl group having at least two carbon atoms.

It should be understood by one of ordinary skill in the art, based on this disclosure, that selection of functional groups and substitution of other groups having a similar chemical effect for R, $R^1$, X, Y and Z within the organometallic and organometalloid compounds having preferred formula (VII) is within the scope of this invention. The addition of inert species to preferred formula (VII) which does not affect the sealing ability of the organometallic or organometalloid compositions is also within the scope of the present invention.

The sealing composition is preferably used as an additive to a system as described above for the dehydrating and passivating compositions. The sealing compositions function by being transported through a system by the action of the working fluid. The working fluid transports the sealing composition to an opening, such as a leak, which allows the sealing composition to escape with the working fluid to the outer environment. The working fluid preferably volatilizes to the gaseous state on exposure to the ambient atmosphere. The sealing compositions transported to the leak by the working fluid preferably has a lower vapor pressure and higher boiling point than the working fluid. The compositions remain on the external surface at the exit point from the system where they can react to form a seal.

The sealing compositions are preferably compatible with the dehydrating and passivating compositions according to the present invention, and are preferably inert to the lubricants and/or working fluids, as described above, within the system. In a preferred embodiment, the sealing compositions are preferably soluble in the working fluid. The sealing compositions may also be soluble in the lubricant, or in both the lubricant and the working fluid. The sealing compositions according to the present invention are preferably soluble in fluorocarbon-based working fluids, including, for example, CFC (R-12), HCFC (R-22), HFC (R-134a).

It is preferred that the sealing composition be used after addition of a dehydrating and passivating composition such that co-reactants formed from the dehydration and passivation reactions and other species present from addition of the dehydrating and passivating compositions may react with the sealant. The reaction products will have the capability to enhance the speed with which the sealing compositions close openings in the system and the seal integrity by increasing flexibility and adhesion to external system surfaces.

Preferred organometallic sealing compositions and co-reactants which are very effective for producing rapidly cured sealing films are compounds containing the metals, Pb, Sn, Zr, Al and V. Slower, but still acceptable curing rates are achieved by organometallic compositions and co-reactants containing Ti, Cr, Mn, Fe, Co and Zn. All of these organometallic sealing compositions, however, are capable of producing acceptable curing times for sealing systems such as evaporative-compressive refrigeration systems. Sealing time is increased at higher temperatures. In addition, the sealing compositions are more stabilized when diketone derivatives, such as, for example, 2,4-pentanedione, biacetyls and acetoacetic esters are present.

In addition, since prior addition of dehydrating compositions leaves the system free of water and the interior surfaces dehydrated and passivated, the polyfunctional sealing compositions do not form particulates or bond to inner working surfaces. The sealing compounds are free to circulate through the system with the working fluid until they exit through an opening in the fluid enclosure of the system, such as a leak or crack, and are exposed to the atmosphere and external surface of the system. If the interior surfaces are already passivated, oil and lubricants are not retained on the surfaces to trap the soluble sealing compositions or diminish flow and availability of the sealing composition before it can exit to an opening which needs to be sealed.

The external surface of the system is preferably metal, metal oxide, metal hydroxide or similar materials as described above with respect to the interior system surfaces.

Figure 2:
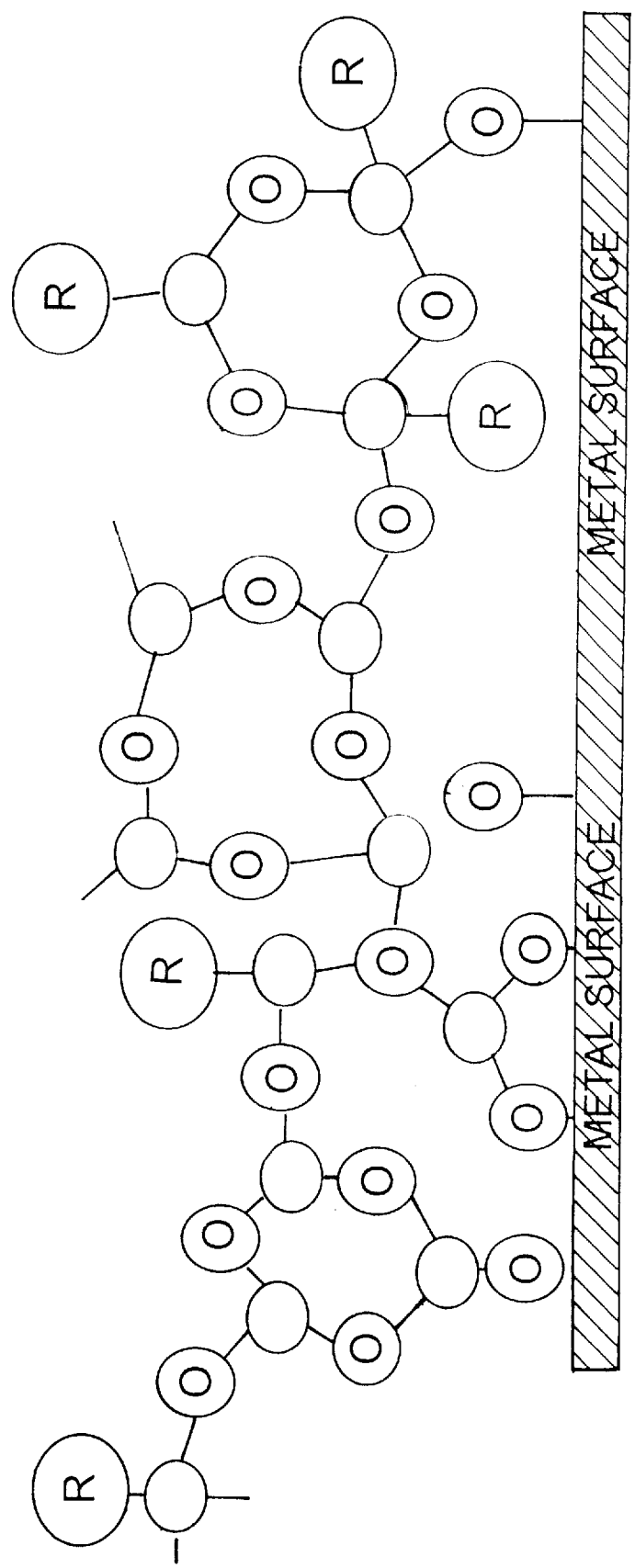
FIG. 2 is a greatly enlarged planar schematic diagram of an external surface after exposure to and reaction with a preferred sealing composition according to the present invention.

Once in contact with the atmosphere, the sealing compositions chemically react with atmospheric moisture and the external surface of the system to form a polymeric seal bound to the external surface. The compositions form three-dimensional molecular networks containing organometallic and/or organometalloid species as shown in FIG. 2. Bonding to a metal external surface occurs rapidly providing excellent adhesion. Additional sealing composition exiting the opening continues to build polymeric layers on hydrolysis with the atmospheric moisture, sealing the system until the composition can no longer exit the opening which is completely sealed. The cross-linked organometallic and/or organometalloid polymers rapidly become solids to seal the leak at the opening.

If a seal formed by the present composition is mechanically broken by physical abrasion or rubbing, more refrigerant and sealant escapes through the opening, and will again react with atmospheric moisture and the external surface to reseal the opening. As such, the present compositions are self-sealing. The sealing compositions exhibit the same type of chemical bonding to the external surface of the system as is formed between the dehydrating compositions and the interior surfaces of the system. Hydrolysis produces oxymetal/oxymetalloid species which form permanent bonds to exterior surfaces in the system.

The sealing compositions preferably function with the dehydrating compositions such that increased efficiency and sealing rates providing better seal integrity over a wide range of temperatures is achieved. Sealing compositions including enoxy functionalities have good reactivity toward moisture, have good thermal stability, are compatible with fluorocarbon-based working fluids and their associated lubricants, and exhibit good or excellent adhesion to a wide range of metal surfaces on hydrolysis.

It is preferred that the sealing compositions be added to the system in an amount no greater than about 10 percent by weight of a working fluid charge, such as a refrigerant charge. Preferably, the sealing compositions are mixed with the lubricant and/or the working fluid to form a homogeneous or heterogeneous mixture or solution prior to adding the sealing composition to the system. When adding the sealing compositions in this manner, the composition preferably comprises up to about 60 percent by weight of the mixture or solution.

In preferred embodiments, the sealing compositions include binary compound compositions in which each compound in the composition includes at least three hydrolyzable functional groups bound to the central metal and/or metalloid elements. Preferred compositions include combinations of metal and metalloid compounds containing hydrolyzable groups which react with moisture through hydrogen transfer reactions to produce metal-oxygen and metalloid-oxygen bonds and protonated organic species from the displaced functional groups. By using preferred compounds having at least three hydrolyzable groups, the composition functions better to form a crosslinked three-dimensional network as shown in FIG. 2 bonded to the external surface and provides a tough, rigid seal over an opening in the system.

Preferred sealing compositions according to the present invention include ternary compositions including alkyltrialkoxysilanes, vinyltrialkoxysilanes and dialkylbis (2,4-pentanedioate)tin, for example, a preferred ternary composition including about 100 parts methyltrimethoxysilane, from about 1 to about 100 parts of vinyltrimethoxysilane and from about 1 to about 100 parts of dibutylbis(2,4-pentanedioate)tin.

It should be understood by one skilled in the art, based on this disclosure, that other components or additives which are compatible with and/or inert with respect to the disclosed organometallic and organometalloid compositions, and which do not interfere with the intended functions of those compositions may be added to the dehydrating, passivating and sealing compositions for such purposes as stabilizing, preserving or packaging the compositions as described above without departing from the invention. Further, other such compatible and/or inert additives which may act as reaction catalysts such that the compositions are customized for a particular interior or external surface are also within the scope of the invention as claimed.

The preferred method for dehydrating a HVAC and refrigeration system having a fluid enclosure according to the present invention includes the step of adding a composition to a system as described above. The composition preferably includes an organometallic compound. More preferably, the composition includes an organometallic and/or an organometalloid composition. In a preferred method for dehydrating and passivating such systems, a composition preferably comprising at least one compound including an organometallic and/or organometalloid composition is added to the system.

The organometallic compound preferably has at least one alkoxy, carboxy and/or enoxy functional group bound to the metal element within the compound. The organometalloid compound preferably has at least one enoxy functional group bound to the metalloid element within the compound. Preferably, the organometallic and organometalloid compounds useful for the present method include those compounds as described above as preferred dehydrating and passivating compositions, including preferred compositions having organometallic and organometalloid compounds having formula (II) as described above.

The system is then dehydrated by allowing the composition to react with $H_2O$ in the system, such that, preferably co-reactants as described above are formed. The co-reactants act as catalysts to increase the rate of the dehydration and, preferably, the passivation reactions. The system is also sealed. The surface is dehydrated and passivated as described above by also allowing the compositions to react with interior surfaces within the fluid enclosure of the system, preferably metal, metal oxide, metal hydroxide and similar interior surfaces. The system is also sealed.

In a preferred method for sealing an HVAC or a refrigeration system. A composition is added to a chemically dehydrated system having a fluid enclosure, an external surface and an opening. The composition comprises at least one second compound which includes a second organometalloid and/or a second organometallic sealing compound according to the present invention. Preferably, the second organometallic compound has at least one hydrolyzable functional group bound to the metal, and the group is an alkoxy, carboxy and/or an enoxy functional group. The second organometalloid compound preferably has at least three hydrolyzable groups bound to the metalloid element. At least one of the hydrolyzable groups is an enoxy functional group. The composition is preferably added to the system after dehydrating and passivating the system, and more preferably, after dehydrating and passivating the system with the above-described dehydrating and passivating compositions.

The sealing composition exits through the opening in the system as described above such that it contacts an external surface. The composition then reacts with atmospheric moisture and the external surface to form a polymeric seal bound to the external surface to close the opening.

The invention will now be described in more detail with respect to the following specific, non-limiting examples:

EXAMPLE I

The passivation effect of the dehydrating compositions of the present invention is demonstrated by comparing the surface energies of untreated substrates to the surface energies of substrates treated with a dehydrating composition according to the present invention. Metal substrates of silicon and aluminum having only native oxide surfaces and one substrate with man-made oxided surfaces were measured with a commercial goniometer to determine the degree of surface energy as determined by a water droplet contact angle. High surface energies are indicated by low contact angles due to polar attractions. Removal of the polar nature of the surface by incorporation of a silicon group repels the highly polar water molecules resulting in high contact angles (which can only approach 90°) indicating lower surface energy.

Table I demonstrates the dramatic reduction in surface energy on treatment of the substrates with a preferred dehydrating composition including the organometalloid, isopropenoxytrimethylsilane (IPTMS). High contact angles demonstrate the repulsion of water from the surface and lower contact angles demonstrate the greater affinity of water for the surface.

TABLE I

| Substrate | Treatment | Observed Contact Angle |
|---|---|---|
| Aluminum | None | <10° |
| Aluminum | IPTMS | 32° |
| Aluminum Oxide | None | <10° |
| Aluminum Oxide | IPTMS | 58° |
| Silicon | None | 34° |
| Silicon | IPTMS | 50° |
| Silicon Oxide | None | <15° |
| Silicon Oxide | IPTMS | 63° |

EXAMPLE II

A dehydrating compound was prepared by combining 240.2 grams of dimethyldimethoxysilane in a flask with 205.4 grams of 2,4-pentanedione and 5 grams of tetrabutyltitanate. The resulting solution was heated and stirred. Methyl alcohol was slowly distilled from the reaction phase over 60°–65° C. After collection of 60 grams of methyl alcohol, the reaction proceed under a vacuum for 30 minutes to remove remaining alcohol and light components. The remaining yellow liquid contained 2-dimethylmethoxysiloxypent-2-ene-4-one. The yellow liquid was recovered, and used without further purification.

EXAMPLE III

A solution containing 1 molar equivalent of hexafluoroacetyl acetone and 300 ml diethylether was magnetically stirred while adding 1 mole of diethylaminotrimethylsilane dropwise over a period of 60 minutes. The resulting solution was heated, and diethylamine and diethylether were distilled from the solution. The remaining liquid was flash-distilled at a pressure of 2 torr to yield a clear liquid containing 2-trimethylsiloxyhexafluoropent-2-ene-4-one, useful as a dehydrating compound.

EXAMPLE IV

A dehydrating composition containing 5 parts of isopropenoxysilane, 5 parts of dimethyldimethoxysilane and 2 parts of dibutylbis(2,4-pentanedioate)tin was prepared under a dry nitrogen atmosphere in a 1 liter flask. The solution was stirred at 50° C. for a period of 30 minutes, cooled and placed in a sealed bottle. A pressure vial containing 100 grams of R-134a having a pre-measured water content (Karl Fisher) of 80 ppm was treated with 1 gram of the prepared dehydrating composition to form a treated solution. The treated solution was sealed and observed at different temperatures. The refrigerant and dehydrating composition were soluble at temperatures of from −40° C. to 60° C. No precipitation or formation of particles was observed. No detectable water was found after a determination of water content by a Karl Fisher titration.

EXAMPLE V

A dehydrating composition was prepared by combining 10 parts of dimethyldiethoxysilane, 2 parts of 2-dimethylmethoxy-siloxypent-2-ene-4-one and 2 parts of dibutyldimethoxytin under nitrogen, and heating the solution while stirring for a period of 30 minutes to 50° C. One part of the solution was added to 9 parts of Freon® TF having a water content of 60 ppm and was completely soluble in the Freon® TF. After 5 minutes, the solution was measured by Karl Fisher titration and found to have less than 5 ppm water. The dehydrating/Freon® TF solution described above was poured onto an aluminum substrate having a contact angle of 34° as measured by a goniometer. The aluminum substrate was rinsed with additional Freon® TF and found to have a contact angle of 49°. A quartz slide having a contact angle of 15° was treated by dipping into the solution. After treatment the quartz slide had a contact angle of 70°.

EXAMPLE VI

A dehydrating composition was prepared by combining 5 parts of 2,4-pentanedione, 6 parts of trimethylmethoxysilane and 2 parts of dibutylbis(2,4-pentanedioate)tin in a flask. The solution was heated and methanol was removed. The remaining liquid was stripped under vacuum in a Buchler Rotovac® at a pressure of 20 torr with a bath temperature of 35° C. The clear, yellow solution was not purified further.

EXAMPLE VII

A dehydrating compound was formed by combining 192.2 grams of ethylbenzoylacetate in a 1-liter flask with 300 milliliters of diethylether, and magnetically stirring the solution as 161 grams of hexamethyldisilazane was added dropwise. The solution was refluxed until ammonia evolution ceased, and was distilled under a vacuum to yield a lubricant-soluble 1-trimethylsiloxy-1-methoxy-3-phenylprop-1-ene-3-one.

EXAMPLE VIII

A dehydrating composition was made by combining methylacetoacetate in an equal molar ratio with dimethyldimethoxysilane and one tenth molar titanium diisopropoxidebis(ethylacetoacetate) under a nitrogen atmosphere. The solution was magnetically stirred with heating, and methanol was distilled out of the solution over a period of 6 hours. The reaction mixture was stripped of volatile components at 10 torr to yield a liquid containing O-dimethylmethoxysiloxy-1-methoxy-1-but-1-one-3-ene.

EXAMPLE IX

A dehydrating compound was prepared by the dropwise addition of octyldimethylchlorosilane to an equal molar solution of 2,2,6,6-tetramethyl-3,5-heptanedione and triethylamine in ethyl ether. The mixture was heated until it refluxed for a period of 6 hours, and filtered to remove salts. The solvent was removed under reduced pressure to yield 3-(octyldimethylsiloxy)-2,2,6,6-tetramethylhept-3-ene-5-one.

EXAMPLE X

Dehydrating compositions according to the present invention were tested by use of a Garret-Signal test demonstration refrigeration unit. The unit has an evaporator, air cooled condenser, and capillary valve, and is powered by a Peewee PW7.5K 14, 115 V, 60 Hz, LRA 28 compressor. The unit also has an operating HCFC-22 refrigerant, having four glass, high-pressure viewing tubes, each approximately ¾"×3" installed in high pressure and low pressure sides of the unit to allow visual observations and determinations of the operation of the unit. Measurements of evaporator and condenser temperatures were made with thermocouples attached to the surfaces of the evaporator and the condenser. Operation of the test unit showed temperatures of 18° F. in the evaporator. Air passing through the condenser was 110° F. (outside air 95° F.). Ten grams of a dehydrating mixture prepared in the same manner as in Example I was placed in an evacuated container and connected to a refrigeration manifold. The solution was admixed with refrigerant from the high-pressure supply and then introduced through the inlet to the low-pressure side over a period of 5 minutes. Temperatures at the evaporator dropped immediately after addition was complete and stabilized after 10 minutes at 8° F., indicating a 10° F. drop in temperature. Air passing through the condenser unit increased in temperature to 114° F. Light yellow oil films on interiors of sight tubes were removed after about 5 to 10 minutes producing clear non-colored tubes.

EXAMPLE XI

A 1990 Ford® 250 truck having four temperature recorders installed at the car's inner air ducts was operated for 30 minutes at differing engine rpms. Average temperatures were recorded. A dehydrating composition including one part isopropenoxytrimethylsilane, two parts dimethyldimethoxysilane and one part dibutylbis(2,4-pentanedioate)tin with a combined weight equal to 2.5% of a total R-12 refrigerant charge was introduced into the air conditioning system through an inlet to the service valves. Within 5 minutes of addition, the temperatures measured at the air duct inlets had decreased five degrees. Average temperature drop after 15 minutes of operation, compared to the average temperatures before addition was 5.5° F.

EXAMPLE XII

A Garret-Signal demonstration unit mechanically equivalent to that described in Example IX, not having been previously treated with dehydrant formulation was evacuated of refrigerant and lubricant. The unit was recharged with HCFC-22 refrigerant and a weighed volume of lubricant (SUNISCO® 3GS, 150 ctsk) equal to one-third the weight of the refrigerant charge. The unit was operated and a dehydrating composition including isopropenoxytrimethylsilane and 1-trimethylsiloxy-1-methoxy-3-phenylprop-1-ene-3-one was introduced through an inlet to the unit. After one hour the unit was stopped and refrigerant and oil charges removed. Lubricant weight had increased by eleven percent due to returned oil from the heat exchanger sections.

EXAMPLE XIII

A sealing composition was prepared by combining ten parts methyltrimethoxysilane and 2 parts dibutylbis(2,4-pentanedioate)tin with stirring under a dry nitrogen atmosphere. The solution was placed on a flat aluminum panel and compared to a control sample of pure methyltrimethoxysilane containing no organometallic co-reactant. Samples were allowed to react at ambient temperature (72° F.) and 50% R.H. Complete cure of the sealing composition to a clear hard film with good adhesion and no cracks for the organometallic sealing composition was obtained in 15 minutes. The film remained unchanged after 5 days. The methyltrimethoxysilane control sample containing no organometallic co-reactant exhibited no evidence of cure and remained a liquid with little evidence of set-up or reaction in 1 hour. The material had nearly completely evaporated within five days with little residue remaining.

EXAMPLE XIV

A sealing composition was prepared from 4 parts of methyltrimethoxysilane, 4 parts of vinyltrimethoxysilane and 3 parts dibutyltindilaurate. The composition was introduced into a Garret-Signal test refrigeration unit as described previously in Example IX that had been previously treated with a dehydrating and passivating composition as described in Example XI. The amount of sealing composition added was equivalent to 2 percent by weight of a CFC-12 refrigerant charge. The unit was operated and the low pressure side was monitored and found to be completely sealed within 6 hours.

EXAMPLE XV

An air conditioning unit containing a 10 pound charge of HCFC-22 was properly dehydrated and passivated utilizing a composition as described in Example X. A sealing composition weighing 50 grams was prepared from 2 parts propyltrimethoxysilane, 3 parts methyltrimethoxysilane and 2 parts dibutylbis(2,4-pentanedioate)tin. The composition was diluted in approximately 50 grams of HCFC-22 and introduced through an inlet into the low pressure (suction) side of the unit. The unit was operated for ten minutes. A valve installed in the low-pressure side was then opened to effect a leak in the system. The valve was adjusted to provide a leak of approximately 1 percent of charge per day as determined by bubble flow rate. The leak was sealed completely within 8 hours.

EXAMPLE XVI

A series of sealant compositions as set forth in Table II were made in accordance with the present invention. Each was diluted in the individual refrigerants CFC-12, HFC-134a and HCFC-22 at up to 20 percent by weight of the refrigerant. All compositions were completely soluble in the refrigerants. Each of the resulting refrigerant/sealant compositions were individually contained in delivery systems attached to ¼" copper tubing having a sealed end and a number of small holes in the tubing to allow the refrigerant/sealant composition to escape. The copper tube was placed under the surface of water, the valve opened and the refrigerant/sealant compositions allowed to escape into the water representing a 100% R.H. environment or a water cooled refrigeration and air conditioning system. The refrigerant/sealant compositions caused rapid bubbling of the water, however the bubbling rapidly diminished and finally ceased, indicating the formation of a complete seal. All of the following formulations produced such seals in under three minutes with the average sealing time being 80 seconds.

TABLE II

| | Sealing Composition | Ratio* |
|---|---|---|
| 1 | A) methyltrimethoxysilane<br>B) vinyltrimethoxysilane<br>C) isopropyltitanate | A:B:C is 2:2:1 |
| 2 | A) vinyltrimethoxysilane<br>B) dibutyltindilaurate | A:B is 5:1 |
| 3 | A) propyltrimethoxysilane<br>B) methyltrimethoxysilane<br>C) dibutylbis (2,4 pentanedioate) tin | A:B:C is 1:1:1 |
| 4 | A) methyltriethoxysilane<br>B) dibutylbis (2,4 pentanedioate) tin | A:B is 1:1 |
| 5 | A) vinyltrimethoxysilane<br>B) methyltrimethoxysilane | A:B:C:D is |

TABLE II-continued

| Sealing Composition | Ratio* |
|---|---|
| C) ethylsilicate-50<br>D) dimethylhydroxyoleate tin | 10:10:5:1 |

*ratio of parts by weight

EXAMPLE XVII

A number of sealing compositions prepared in accordance with the present invention were prepared and tested for rapidity and integrity of cure and adhesion. The compositions were compared to two control sealing compositions which did not contain at least one component having at least three hydrolyzable groups, at least one of which is an enoxy functional group. All of the compositions were tested on various metal substrates and glass slides in a low relative humidity environment to prolong curing times. With few exceptions, the sealing compositions according to the present invention showed rapid curing times, good surface adhesion and produced a seal having flexibility and integrity. The control compositions did not exhibit these properties. The components used in the control compositions and in the compositions according to the invention and their corresponding codes for the purposes of reporting the test results are listed in Table III, below. Table III also lists a numerical rating system for evaluating the compositions for their sealing characteristics after passage of specific time intervals as set forth in Table IV which follows Table III. "Excellent" cure and seal characteristics are indicated by a rating of 6. "Good" ratings are indicated by 5 and 9, a "Fair" rating is represented by a 4 or 8, and a "Poor" or "Incomplete" cure rating is indicated by a 1, 2, 3, 7 and 10.

TABLE III

| CODES | COMPONENTS |
|---|---|
| MTMS | Methyltrimethoxysilane |
| VTS | Vinyltrimethoxysilane |
| ETS | Polyethylsilicate |
| A | Dibutyltindilaurate |
| B | Dibutylbis (2,4-pentanedioate) tin |
| C | Titanium diisopropoxidebis (ethylacetoacetate) |
| | CURE |
| 1 | Liquid - no evidence of cure |
| 2 | Liquid - some hardening around the edges |
| 3 | Tacky Film |
| 4 | Soft, Non-Tacky Film |
| 5 | Hard Film, Complete Set-up, Clear |
| 6 | Hard Film, Good Adhesion, No Cracking |
| 7 | Evaporated - Little or No Residue |
| 8 | Hard Film, Cracking, No Adhesion |
| 9 | Hard Film, Moderate Adhesion |
| 10 | Liquid - Little or No Cure Evidenced |

The results of these tests are reported in Table IV below:

TABLE IV

| Compositions | Component Ratio | 1 min. | 3 min. | 5 min. | 15 min. | 60 min. | 5 days |
|---|---|---|---|---|---|---|---|
| MTMS* | — | 1 | 1 | 2 | 2 | 7 | 7 |
| MTMS/A | 5:1 | 2 | 3 | 4 | 5–6 | 6 | 6 |
| MTMS/B | 5:1 | 2 | 3 | 3–4 | 6 | 6 | 6,9 |
| VTS | — | 1 | 1 | 7 | 7 | 7 | 7 |

TABLE IV-continued

| Compositions | Component Ratio | 1 min. | 3 min. | 5 min. | 15 min. | 60 min. | 5 days |
|---|---|---|---|---|---|---|---|
| VTS/A | 5:1 | 2 | 3 | 4 | 5 | 5 | 6 |
| VTS/B | 5:1 | 2 | 3 | 3 | 3 | 5 | 6 |
| ETS* | — | 1 | 1 | 1 | 1 | 1 | 10 |
| ETS/A | 5:1 | 1 | 1 | 1 | 1 | 2 | 8 |
| B | — | 1 | 1 | 1–2 | 2 | 3 | 8 |
| MTMS/VTS/B | 10:5:1 | 2 | 4 | 5 | 6 | 6 | 6 |
| MTMS/VTS/B | 5:5:10 | 2 | 5 | 6 | 6 | 6 | 6 |
| MTMS/VTS/ETS | 4:4:2 | 1 | 1 | 1 | 2 | 10 | 10 |
| MTMS/VTS/ETS/B | 4:4:2:1 | 2 | 3 | 5 | 5 | 6 | 6 |
| MTMS/VTS/ETS/C | 4:4:2:1 | 2 | 3 | 4 | 5 | 5 | 6 |

*control compositions

The majority of the sealing compositions according to the present invention yielded an excellent cure rating. Single component compositions provided overall good performance. Generally, the results show the addition of more than one compound to compositions according to the present invention forming binary or ternary compositions significantly improved the curing characteristics of the single compound compositions. In addition, providing a compound according to the present invention including dibutyltindilaurate (A) and dibutylbis(2,4-pentanedioate)tin (B) to the control compositions, methyltrimethoxysilane (MTMS) and polyethylsilicate (ETS), providing compositions according to the present invention of MTMS/A, MTMS/B, ETS/A and ETS/B which all showed improved curing characteristics over the control compositions. While VTS does not itself provide good sealing characteristics, in combination with A; B; MTMS and B; MTMS, ETS and B; and MTMS, ETS and C, the curing results were significantly improved.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A method for dehydrating HVAC and refrigeration systems, comprising the steps of:

(a) adding to a system having a fluid enclosure a composition comprising at least one organometallic compound having at least one functional group selected from the group consisting of enoxy, carboxy, and alkoxy, the functional group being bound to a metal element within the organometallic compound, wherein the organometallic compound in the composition has a formula:

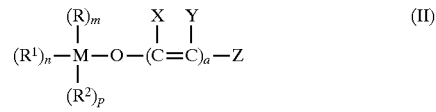

wherein:

M is an element selected from the group consisting of Sn, Pb, Ti, Zr, Hf, V, Al, Cr, Mn, Fe, Co, and Zn;

R is selected from the group consisting of straight and branched chain alkyl groups of from 1 to 18 carbon atoms, cycloalkyl and cycloalkene groups of from 3 to 8 carbon atoms, fluorine-substituted alkyl groups of from 1 to 12 carbon atoms, fluorine-substituted cyloalkanes and fluorine-substituted cycloalkenes of from 3 to 8 carbon atoms, phenyl, ethylenephenyl, straight and branched chain alkene groups of from 2 to 18 carbon atoms, alkyl-substituted phenyl, and Z';

$R^1$ is selected from the group consisting of R,

—OR, and —$O_2CR$;

$R^2$ is selected from the group consisting R, —OR, and —$O_2CR$;

X is selected from the group consisting of hydrogen, straight and branched chain alkoxy groups of from 1 to 18 carbon atoms, straight and branched chain fluorine-substituted alkoxy groups of from 1 to 18 carbon atoms, phenoxy, benzyloxy, straight and branched chain alkyl groups of from 1 to 18 carbon atoms, cycloalkyl and cycloalkene groups of from 3 to 8 carbon atoms, fluorine-substituted alkyl groups of from 1 to 12 carbon atoms, fluorine-substituted cycloalkanes and fluorine-substituted cycloalkenes of from 3 to 8 carbon atoms, phenyl, ethylenephenyl, straight and branched chain alkene groups of from 2 to 18 carbon atoms, and alkyl-substituted phenyl groups;

Y is selected from the group consisting of straight and branched chain alkyl groups of from 1 to 18 carbon atoms, cycloalkyl and cycloalkene groups of from 3 to 8 carbon atoms, fluorine-substituted alkyl groups of from 1 to 12 carbon atoms, fluorine-substituted cycloalkanes and fluorine-substituted cycloalkenes of from 3 to 8 carbon atoms, phenyl, ethylenephenyl, straight and branched chain alkene groups of from 2 to 18 carbon atoms, alkyl-substituted phenyl groups, and Z;

Z is selected from the group consisting of hydrogen and Z';

Z' is selected from the group consisting of straight and branched chain 1-carbonyl-substituted alkane groups of from 1 to 18 carbon atoms, straight and branched chain 1-carboxy-substituted alkyl groups of from 2 to 18 carbon atoms, straight and branched chain alkoxy groups of from 1 to 18 carbon atoms, straight and branched chain fluorine-substituted 1-carbonyl alkyl groups of from 2 to 18 carbon atoms, 1-carboxy-o-alkylesters having at least one selected from the group consisting of straight and branched chain alkyl groups of from 1 to 18 carbon atoms, 1-carboxy-o-phenyl esters, 1-carboxy-o-ethylene oxide esters having from 1 to 20 ethylene units, benzoyl, alkyl-substituted benzoyl having alkyl groups of from 1 to 8 carbon atoms, and o-benzoate;

a is an integer from 0 to 2;

m is an integer from 0 to 4; and n is an integer from 0 to 1;

p is an integer from 0 to 4, wherein the sum of m+n+p+1 is equal to the oxidation potential of M; and when all of a, m, n, and p are 0, Z equals Z';

(b) dehydrating the system by allowing the organometallic compound in the composition to react with $H_2O$ in the system; and sealing the enclosure.

2. The method according to claim 1, wherein the enclosure comprises an interior surface and the composition reacts with the interior surface to passivate and coat the interior surface.

3. The method according to claim 2, wherein the interior surface comprises a material selected from the group consisting of metal, metal oxide, and metal hydroxide.

4. The method according to claim 1, wherein the composition further comprises an organometalloid compound comprising a metalloid element selected from the group consisting of Si, Ge, B, As, Sb, and Te.

5. The method of claim 4, wherein the organometalloid compound comprises at least one enoxy functional group bound to a metalloid element within the organometalloid compound.

6. The method according to claim 5, wherein at least one enoxy group bound to the metal element and at least one enoxy group bound to the metalloid element is selected from the group consisting of a 1-propenoxy-substituted alkyl group having at least two carbon atoms and an acyloxy-substituted alkyl group having at least two carbon atoms.

7. The method according to claim 1, wherein co-reactants which increase a rate of dehydration are formed by allowing the composition to react with $H_2O$ in step (b).

8. The method according to claim 1, wherein the fluid comprises at least one of a working fluid and a lubricant.

9. The method according to claim 8, wherein the composition is a liquid and is soluble in at least one of the working fluid and the lubricant.

10. The method according to claim 8, wherein the composition dehydrates the lubricant such that the lubricant is stabilized to prevent hydrolysis.

11. The method according to claim 8, wherein the working fluid is selected from the group consisting of hydrofluorocarbon, halofluorocarbon, hydrohalofluorocarbon, fluorocarbon, mixtures thereof, and ammonia.

12. A method for dehydrating and passivating HVAC and refrigeration systems, comprising the steps of:

a) adding to a system having a fluid enclosure a composition comprising at least one compound selected from the group consisting of
(i) an organometallic compound having at least one functional group selected from the group consisting of enoxy, carboxy, and alkoxy, the functional group being bound to a metal element within the organometallic compound, the metal element selected from the group consisting of Sn, Pb, Ti, Zr, Hf, V, Al, Cr, Mn, Fe, Co, and Zn and
(ii) an organometalloid compound having at least one enoxy functional group bound to a metalloid element within the organometalloid compound, the metalloid element being selected from the group consisting of Si, Ge, B, As, Sb, and Te, wherein the organometallic and organometalloid compounds in the composition have a formula:

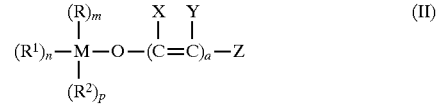

wherein;

M is a metal element selected from the group consisting of Sn, Pb, Ti, Zr, Hf, V, Al, Cr, Mn, Fe, Co, and Zn or a metalloid element selected from the group consisting of Si, Ge, B, As, Sb, and Te;

R is selected from the group consisting of straight and branched chain alkyl groups of from 1 to 18 carbon atoms, cycloalkyl and cycloalkene groups of from 3 to 8 carbon atoms, fluorine-substituted alkyl groups of from 1 to 12 carbon atoms, fluorine-substituted cycloalkanes and fluorine-substituted cycloalkenes of from 3 to 8 carbon atoms, phenyl, ethylenephenyl, straight and branched chain alkene groups of from 2 to 18 carbon atoms, alkyl-substituted phenyl, and Z';

$R^1$ is selected from the group consisting of R, $$O-(\overset{X}{\underset{|}{C}}=\overset{Y}{\underset{|}{C}})_a-Z, \quad (I)$$

—OR, and —O$_2$CR;

$R^2$ is selected from the group consisting R, —OR, and —O$_2$CR;

X is selected from the group consisting of hydrogen, straight and branched chain alkoxy groups of from 1 to 18 carbon atoms, straight and branched chain fluorine-substituted alkoxy groups of from 1 to 18 carbon atoms, phenoxy, benzyloxy, straight and branched chain alkyl groups of from 1 to 18 carbon atoms, cycloalkyl and cycloalkene groups of from 3 to 8 carbon atoms, fluorine-substituted alkyl groups of from 1 to 12 carbon atoms, fluorine-substituted cycloalkanes and fluorine-substituted cycloalkenes of from 3 to 8 carbon atoms, phenyl, ethylenephenyl, straight and branched chain alkene groups of from 2 to 18 carbon atoms, and alkyl-substituted phenyl groups;

Y is selected from the group consisting of straight and branched chain alkyl groups of from 1 to 18 carbon atoms, cycloalkyl and cycloalkene groups of from 3 to 8 carbon atoms, fluorine-substituted alkyl groups of from 1 to 12 carbon atoms, fluorine-substituted cycloalkanes and fluorine-substituted cycloalkenes of from 3 to 8 carbon atoms, phenyl, ethylenephenyl, straight and branched chain alkene groups of from 2 to 18 carbon atoms, alkyl-substituted phenyl groups, and Z;

Z is selected from the group consisting of hydrogen and Z';

Z' is selected from the group consisting of straight and branched chain 1-carbonyl-substituted alkane groups of from 1 to 18 carbon atoms, straight and branched chain 1-carboxy-substituted alkyl groups of from 2 to 18 carbon atoms, straight and branched chain alkoxy groups of from 1 to 18 carbon atoms, straight and branched chain fluorine-substituted 1-carbonyl alkyl groups of from 2 to 18 carbon atoms, 1-carboxy-o-alkylesters having at least one selected from the group consisting of straight and branched chain alkyl groups of from 1 to 18 carbon atoms, 1-carboxy-o-phenyl esters, 1-carboxy-o-ethylene oxide esters having from 1 to 20 ethylene units, benzoyl, alkyl-substituted benzoyl having alkyl groups of from 1 to 8 carbon atoms, and o-benzoate;

a is an integer from 0 to 2;

m is an integer from 0 to 4; and n is an integer from 0 to 1;

p is an integer from 0 to 4, wherein the sum of m+n+p+1 is equal to the oxidation potential of M; and when all of a, m, n, and p are 0, Z equals Z';

b) dehydrating the system by allowing the at least one compound in the composition to react with H$_2$O in the system;

c) passivating and coating an interior surface of the enclosure by allowing the composition to react with the interior surface of the enclosure; and d) sealing the enclosure.

13. The method according to claim 12, wherein co-reactants which increase a rate of dehydration and a rate of passivation are formed by allowing the composition to react with H$_2$O and with the interior surface in steps (b) and (c).

14. The method according to claim 12, wherein the composition comprises both of the organometallic compound and the organometalloid compound.

15. The method according to claim 12, wherein when M is selected from the group consisting of Si, Ge, B, As, Sb, and Te, a is an integer from 1 to 2, m is an integer from 0 to 3, and p is an integer from 0 to 3.

16. The method according to claim 12, wherein Z is a 1-carboxylate-substituted alkyl group having at least two carbon atoms.

17. A method for sealing HVAC and refrigeration systems having a fluid enclosure, comprising chemically dehydrating a system having a fluid enclosure, the enclosure having an external surface and an opening;

adding to the system a composition comprising at least one compound selected from the group consisting of (1) an organometallic compound having at least one hydrolyzable functional group bound to a metal element within the organometallic compound, the hydrolyzable functional group being selected from the group consisting of enoxy, carboxy, and alkoxy, the metal element being selected from the group consisting of Sn, Pb, Ti, Zr, Hf, V, Al, Cr, Mn, Fe, Co, and Zn and (2) an organometalloid compound having at least three hydrolyzable functional groups bound to a metalloid element within the organometalloid compound, at least one of the hydrolyzable groups being an enoxy, the metalloid element being selected from the group consisting of Si, Ge, B, As, Sb, and Te, wherein the organometallic and organometalloid compounds in the composition have a formula:

$$(R^1)_n - \underset{\underset{(R^2)_p}{|}}{\overset{\overset{(R)_m}{|}}{M}} - O - (\overset{X}{\underset{|}{C}}=\overset{Y}{\underset{|}{C}})_a - Z \quad (II)$$

wherein:

M is a metal element selected from the group consisting of Sn, Pb, Ti, Zr, Hf, V, Al, Cr, Mn, Fe, Co, and Zn or a metalloid element selected from the group consisting of Si, Ge, B, As, Sb, and Te;

R is selected from the group consisting of straight and branched chain alkyl groups of from 1 to 18 carbon atoms, cycloalkyl and cycloalkene groups of from 3 to 8 carbon atoms, fluorine-substituted alkyl groups of from 1 to 12 carbon atoms, fluorine-substituted cycloalkanes and fluorine-substituted cycloalkenes of from 3 to 8 carbon atoms, phenyl, ethylenephenyl, straight and branched chain alkene groups of from 2 to 18 carbon atoms, alkyl-substituted phenyl, and Z';

$R^1$ is selected from the group consisting of R, $$O-(\overset{X}{\underset{|}{C}}=\overset{Y}{\underset{|}{C}})_a-Z, \quad (I)$$

—OR, and —O$_2$CR;

$R^2$ is selected from the group consisting R, —OR, and —O$_2$CR;

X is selected from the group consisting of hydrogen, straight and branched chain alkoxy groups of from 1 to 18 carbon atoms, straight and branched chain fluorine-substituted alkoxy groups of from 1 to 18 carbon atoms, phenoxy, benzyloxy, straight and branched chain alkyl groups of from 1 to 18 carbon atoms, cycloalkyl and cyloalkene groups of from 3 to 8 carbon atoms, fluorine-substituted alkyl groups of from 1 to 12 carbon atoms, fluorine-substituted cycloalkanes and fluorine-substituted cycloalkenes of from 3 to 8 carbon atoms, phenyl, ethylenephenyl, straight and branched chain alkene groups of from 2 to 18 carbon atoms, and alkyl-substituted phenyl groups;

Y is selected from the group consisting of straight and branched chain alkyl groups of from 1 to 18 carbon atoms, cycloalkyl and cycloalkene groups of from 3 to 8 carbon atoms, fluorine-substituted alkyl groups of from 1 to 12 carbon atoms, fluorine-substituted cycloalkanes and fluorine-substituted cycloalkenes of from 3 to 8 carbon atoms, phenyl, ethylenephenyl, straight and branched chain alkene groups of from 2 to 18 carbon atoms, alkyl-substituted phenyl groups, and Z;

Z is selected from the group consisting of hydrogen and Z';

Z' is selected from the group consisting of straight and branched chain 1-carbonyl-substituted alkane groups of from 1 to 18 carbon atoms, straight and branched chain 1-carboxy-substituted alkyl groups of from 2 to 18 carbon atoms, straight and branched chain alkoxy groups of from 1 to 18 carbon atoms, straight and branched chain fluorine-substituted 1-carbonyl alkyl groups of from 2 to 18 carbon atoms, 1-carboxy-o-alkylesters having at least one selected from the group consisting of straight and branched chain alkyl groups of from 1 to 18 carbon atoms, 1-carboxy-o-phenyl esters, 1-carboxy-o-ethylene oxide esters having from 1 to 20 ethylene units, benzoyl, alkyl-substituted benzoyl having alkyl groups of from 1 to 8 carbon atoms, and o-benzoate;

a is an integer from 0 to 2;

m is an integer from 0 to 4; and n is an integer from 0 to 1;

p is an integer from 0 to 4, wherein the sum of m+n+p+1 is equal to the oxidation potential of M; and when all of a, m, n, and p are 0, Z equals Z', whereby the composition exits through the opening and the at least one compound in the composition chemically reacts with atmospheric moisture and the external surface to form a polymeric seal bound to the external surface.

18. The method according to claim 17, wherein in the composition, at least one enoxy group bound to the metal element and at least one enoxy group bound to the metalloid element is selected from the group consisting of a 1-propenoxy-substituted alkyl group having at least two carbon atoms and an acyloxy-substituted alkyl group having at least two carbon atoms.

19. The method according to claim 17, wherein the composition comprises both of the organometallic compound and the organometalloid compound.

20. The method according to claim 17, wherein the external surface comprises a material selected from the group consisting of metal, metal oxide and metal hydroxide.

21. A method according to claim 17, wherein when M is selected from the group consisting of Si, Ge, B, As, Sb and Te, then a is an integer from 1 to 2, m is an integer from 0 to 1, and n is an integer from 2 to 3.

22. The method according to claim 17, wherein the fluid comprises at least one of a working fluid and a lubricant.

23. The method according to claim 22, wherein the composition is inert to the lubricant and the working fluid.

24. The method according to claim 22, wherein the working fluid is selected from a group consisting of fluorocarbon, hydrofluorocarbon, halofluorocarbon, hydrohalofluorocarbon, mixtures thereof, and ammonia.

25. The method according to claim 24, wherein the working fluid has a code designated by the American Society of Refrigerating Engineers, the code being selected from the group consisting of 11, 12, 12B1, 13, 13B1, 14, 21, 22, 32, 42, 115, 124, 125, 134, 134a, 143a, 152a, 161, 218, and 227ea.

26. The method according to claim 22, wherein the composition is soluble in the working fluid.

* * * * *